United States Patent
Kaskawitz

(10) Patent No.: US 7,762,050 B1
(45) Date of Patent: Jul. 27, 2010

(54) BAIL-FREE MACHINE CONTROL DEVICES AND METHODS

(75) Inventor: Scott Kaskawitz, Burlington, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/402,052

(22) Filed: Mar. 11, 2009

(51) Int. Cl.
*A01D 69/00* (2006.01)

(52) U.S. Cl. .................. 56/10.8; 56/10.5; 180/19.3

(58) Field of Classification Search .................. 123/400,
123/128 D, 298, 179.16, 179.18, 396; 180/19.3,
180/53.5, 65.1, 332, 68.5; 37/273; 172/42,
172/119, 41; D8/107; 30/276, 277.4, 382;
74/531, 480 R, 526, 483 R, 337.5; 56/10.5,
56/10.8, 11.9; 200/314, 283, 302.2, 524,
200/556, 323, 324, 315
See application file for complete search history.

(56) References Cited

U.S. PATENT DOCUMENTS

| | | | |
|---|---|---|---|
| 3,855,763 A | 12/1974 | Seifert et al. | |
| 4,028,804 A * | 6/1977 | Hammond | 30/382 |
| 4,306,405 A | 12/1981 | Fleigle | |
| 4,413,466 A * | 11/1983 | Beugelsdyk et al. | 56/11.3 |
| 4,466,308 A * | 8/1984 | Kester et al. | 74/483 R |
| 4,503,958 A * | 3/1985 | Nishio | 192/12 R |
| 4,704,847 A | 11/1987 | Greider et al. | |
| 5,517,967 A * | 5/1996 | Nakayama | 123/398 |
| 5,765,445 A | 6/1998 | Miyata | |
| 5,826,667 A * | 10/1998 | Notaras et al. | 172/15 |
| 5,862,713 A * | 1/1999 | Tsunoda et al. | 74/526 |
| 6,006,627 A * | 12/1999 | Ikeda et al. | 74/531 |
| 6,105,263 A * | 8/2000 | Stones et al. | 30/382 |
| 7,201,144 B2 * | 4/2007 | Yuasa | 123/400 |
| 7,318,309 B2 | 1/2008 | Osborne | |

* cited by examiner

*Primary Examiner*—Árpád Fábián-Kovács
(74) *Attorney, Agent, or Firm*—Jenkins, Wilson, Taylor & Hunt, P.A.

(57) ABSTRACT

The present subject matter discloses devices and methods for controlling the operation of a lawnmower or other walk-behind power machines without the use of a bail or operator presence control. A control device for a walk-behind machine can include a handle for a walk-behind machine, a sliding cam movable within the handle, a cable connected to the sliding cam and to a machine control component of the walk-behind machine, and an actuator movably attached to the handle. Movement of the actuator against a cam surface of the sliding cam can move the sliding cam within the handle to move the cable and operate the machine control component.

17 Claims, 4 Drawing Sheets

BAIL-FREE MACHINE CONTROL DEVICES AND METHODS

TECHNICAL FIELD

The subject matter disclosed herein relates generally to machine control components for walk-behind power machines. More particularly, the subject matter disclosed herein relates to machine control devices and methods for a lawnmower or other walk-behind power machines.

BACKGROUND

In the United States, safety regulations require that lawnmowers must be equipped with some type of handle-mounted "dead man" control, an operator presence control device that stops the blade within a brief time (e.g., 3 seconds) after the operator presence control is released. Common systems used for this purpose include zone brake systems and blade brake clutches.

Zone brake systems stop the engine and blade in a short period after the operator releases a zone brake control device, either intentionally or inadvertently. In this regard, movement of the zone brake control to an operating position can release the engine and blade brake and also energize the engine's ignition system. Conversely, movement of the zone brake control to a non-operating or braking position can brake the engine and blade and also deenergize the engine ignition system, stopping the rotating blade within a few seconds. In contrast, a mower equipped with a blade brake clutch can similarly be operated to brake or release the rotating cutting blade, but the engine need not be deenergized.

In either system, one common kind of operator presence control device is a rotatable bail (e.g., a steel wireform bar or lever) mounted to the handle of the lawnmower. Typically, the operator must rotate the bail and hold it in place against the handle of the lawnmower to put the zone brake system or the blade brake clutch in an operable position (i.e., blade and engine on). Although this kind of device provides a valuable (and required) safety feature, such rotating bails can be considered unsightly and uncomfortable to use.

SUMMARY

In accordance with this disclosure, devices and methods for controlling a machine-control component of a lawnmower or any other suitable type of a walk-behind power machine are provided. A control device in accordance with this disclosure can, for example, include a handle for a walk-behind machine, a sliding cam movable within the handle, and an actuator movably attached to the handle. The sliding cam can be configured for operable connection with a machine-control component of the walk-behind machine. The actuator can engage at least a portion of the sliding cam such that movement of the actuator causes movement of the sliding cam, whereby the actuator is movable to cause the sliding cam to move for controlling the machine-control component of the walk-behind machine.

In another aspect, a control device for controlling a machine-control component of a walk-behind machine can, for example, include a handle for a walk-behind machine, a sliding cam movable within the handle, a left actuator movably connected to the handle, and a right actuator movably connected to the handle. The sliding cam can have a left sliding cam and a right sliding cam, each of the left sliding cam and the right sliding cam configured for operable connection with a machine-control component of the walk-behind machine. The left actuator can engage at least a portion of the left sliding cam such that movement of the left actuator causes movement of the left sliding cam, and the right actuator can engage at least a portion of the right sliding cam such that movement of the right actuator causes movement of the right sliding cam. In this way, the left actuator is movable to cause the left sliding cam to move for controlling the machine-control component of the walk-behind machine, and the right actuator is movable to cause the right sliding cam to move for controlling the machine-control component of the walk-behind machine.

In another aspect, a method for controlling a machine-control component of a walk-behind machine can, for example, include moving an actuator attached to a handle of a walk-behind machine towards a sliding cam contained within the handle. The sliding cam can be configured for operable connection with a machine-control component of the walk-behind machine. As a result, moving the actuator can cause the actuator to engage at least a portion of the sliding cam to move the sliding cam such that the machine-control component of the walk-behind machine is controlled.

Some of the objects of the subject matter disclosed herein having been stated hereinabove, and which are achieved in whole or in part by the presently disclosed subject matter, other objects will become evident as the description proceeds when taken in connection with the accompanying drawings as best described hereinbelow

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides devices and methods for controlling the operation of a lawnmower or other suitable types of walk-behind power machines. In one aspect, a control device can be provided for a lawnmower or other power machine, generally designated PM, which is shown for example in FIGS. 2A and 2B. It can be appreciated that the embodiments of the devices and methods disclosed herein are not limited to lawnmowers, as the embodiments can apply to any suitable power machines, and particularly those of the self-propelled, walk-behind type, such as, for example and without limitation, snow blowers, leaf blowers, yard vacuums, tillers, edgers, seeders, trimmers, aerators, fertilizers, palette trucks, graders, vehicles for transportation, pavement and construction machines, and the like.

Figure 1:
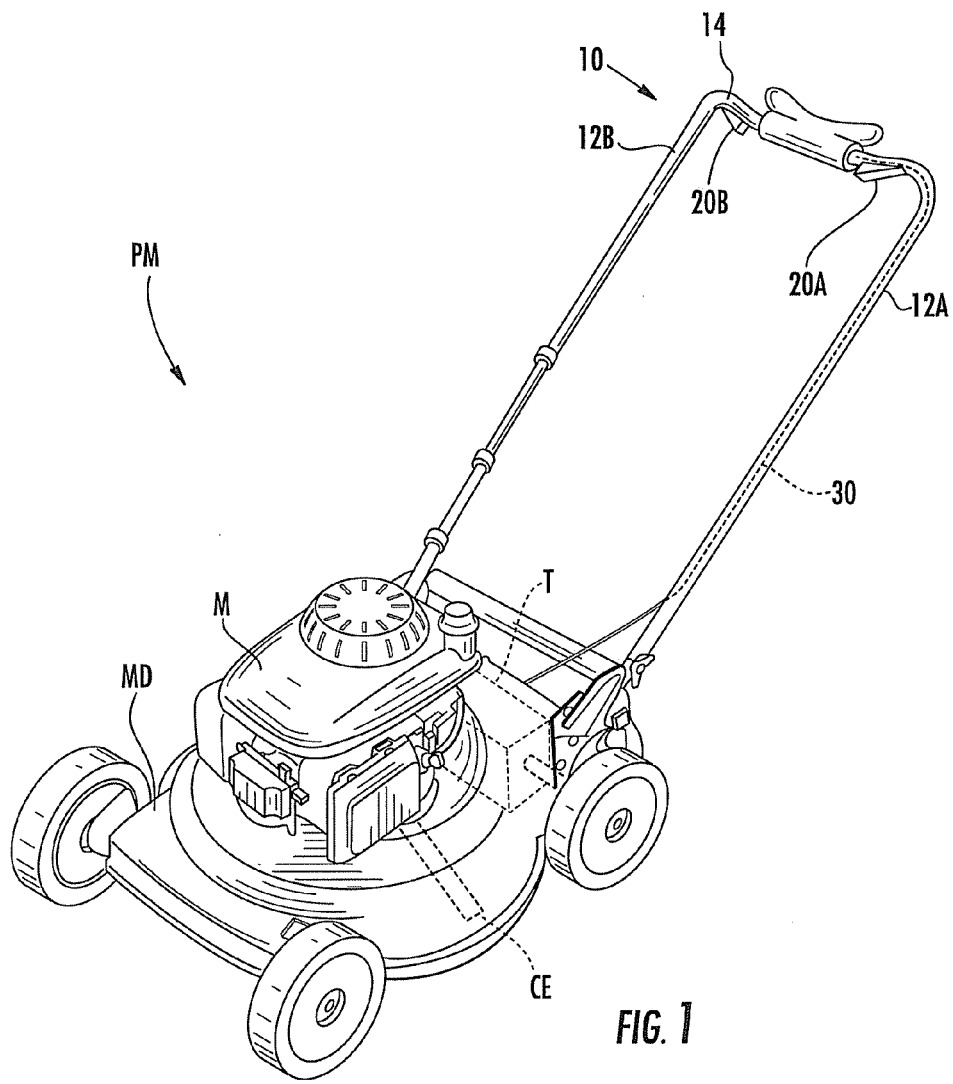
FIG. 1 is a perspective view of a self-propelled machine including a control device according to an embodiment of the presently disclosed subject matter.
Figure 2A:
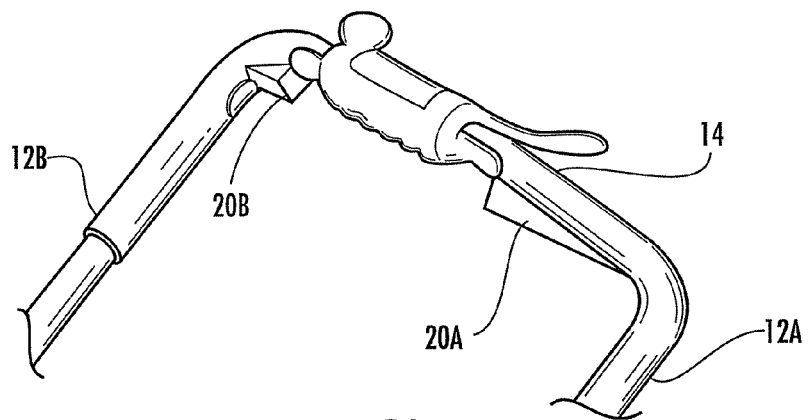
FIG. 2A is a close up, perspective view of a portion of the handle of the walk-behind machine showing the control device from FIG. 1.
Figure 2B:
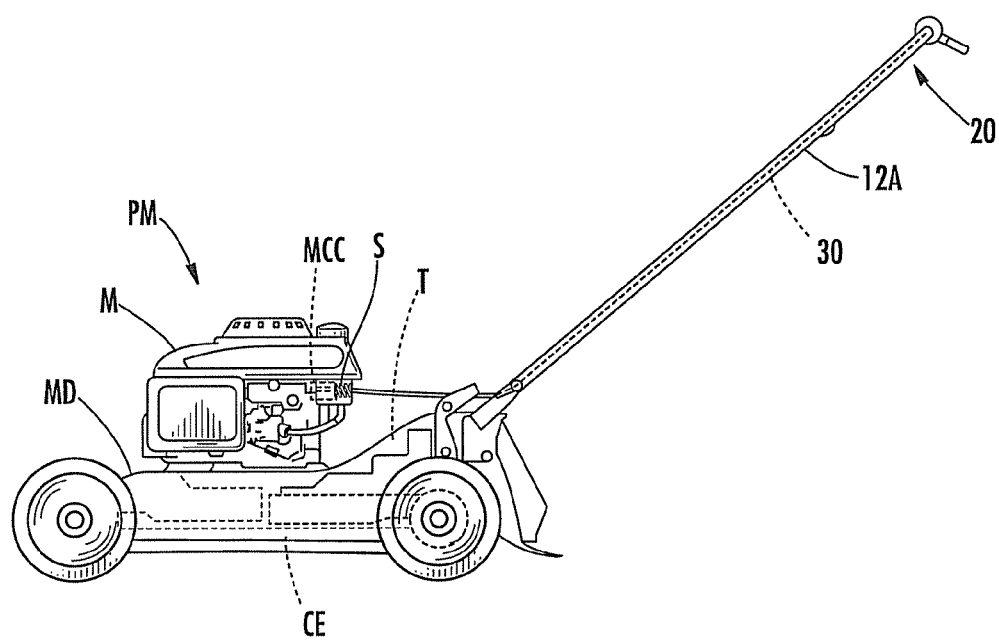
FIG. 2B is a side view of the walk-behind machine of FIG. 1.
Figure 3A:
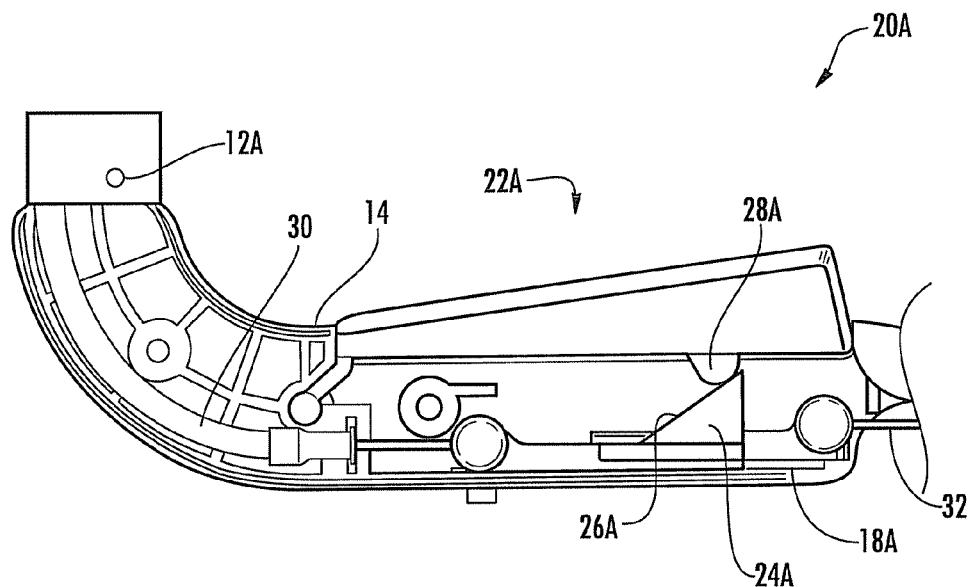
FIGS. 3A and 3B are top sectional views of left and right portions, respectively, of the control device of FIG. 1 shown in a disengaged position according to an embodiment of the presently disclosed subject matter.
Figure 3B:
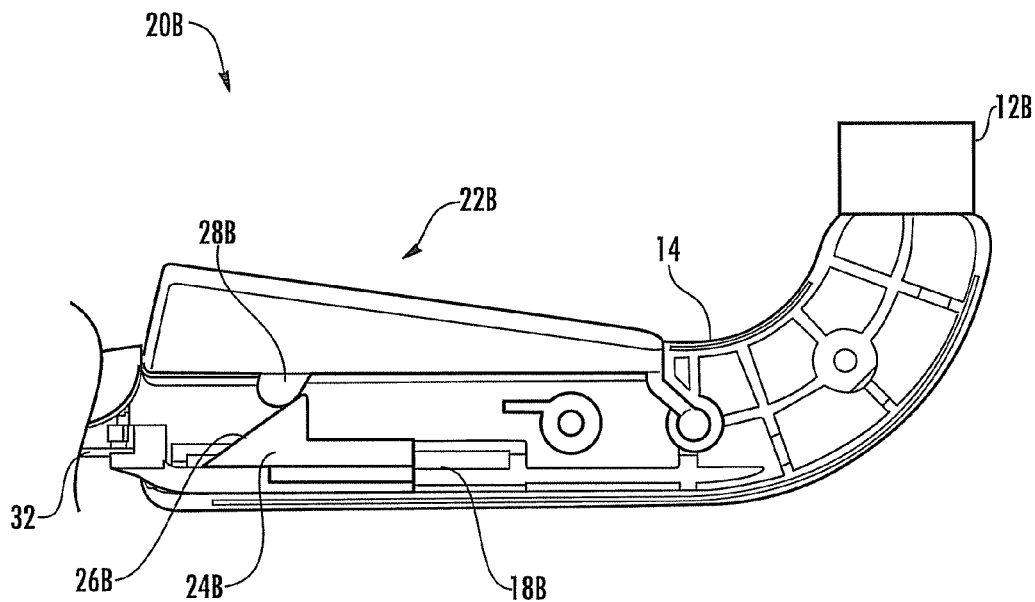
Figure 4A:
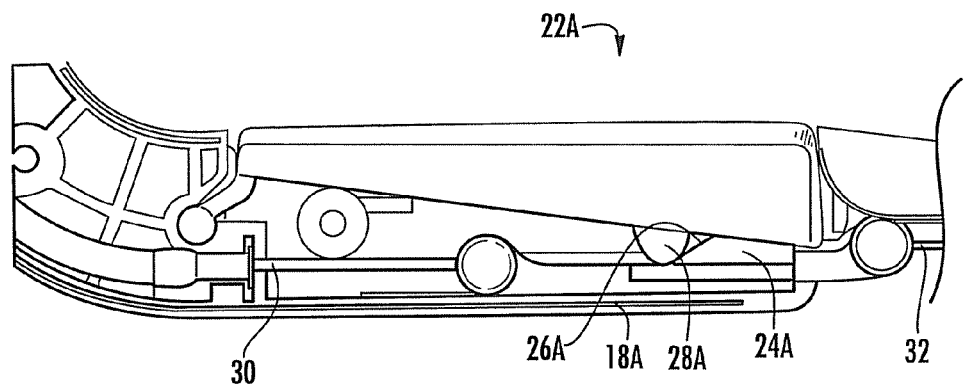
FIGS. 4A and 4B are top sectional views of left and right portions, respectively, of the control device of FIG. 1 shown in an engaged position according to an embodiment of the presently disclosed subject matter.
Figure 4B:
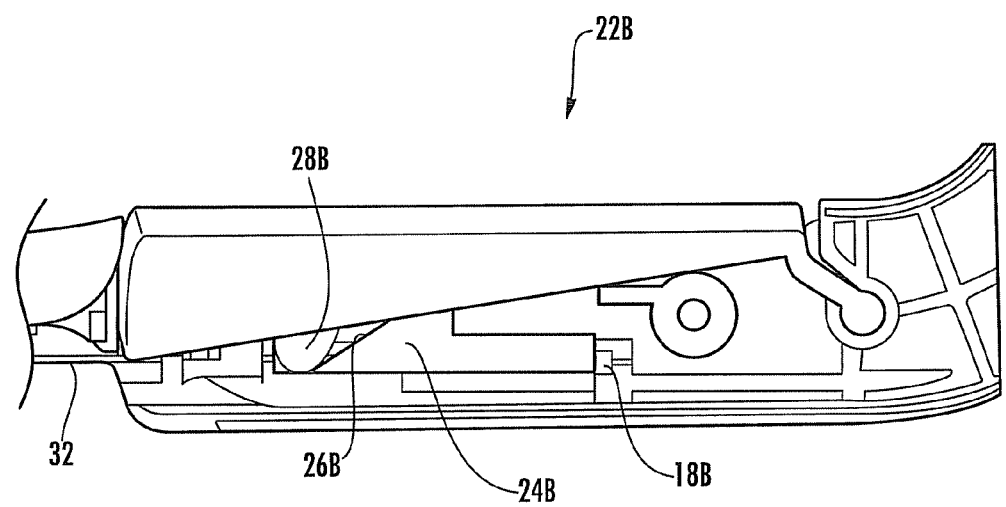

Continuing with the example provided in FIGS. 1, 2A and 2B, power machine PM can comprise any suitable configuration known to persons skilled in the art or later developed. In the exemplary embodiment, power machine PM can include a powered drive system or assembly. As shown in FIGS. 1 and 2B, the powered drive system can include a suitable motor M, such as an electric motor or an internal combustion engine, and a transmission T. Further, power machine PM can include a machine control component MCC (See, e.g., FIG. 2B), such as a zone brake or a blade brake clutch. The different types, structures, and functions of the components of power machine PM just described are generally known to persons skilled in the art, and therefore will not be further described.

Power machine PM can also include a housing, such as a mower deck MD, which can include front, rear, upper exterior, and lower interior portions. Motor M, machine control component MCC, and transmission T can be mounted on mower deck MD (e.g., mounted to an upper exterior portion of mower deck MD), and a suitable cutting element CE (e.g., a blade or blades) can be disposed within the lower interior portion of mower deck MD.

A handle generally designated 10 can be coupled to the rear portion of mower deck MD by any suitable means and can extend upwardly therefrom at an angle appropriate for comfortable grasping and manipulation by an operator. In one embodiment, handle 10 can be generally U-shaped, and thus can include first and second spaced-apart legs 12A and 12B joined by a central portion 14. In some embodiments, central portion 14 can be a two-piece plastic component that can be assembled atop spaced-apart legs 12A and 12B.

Power machine PM can further include a controller that can for example have one or more control devices that can be attached to handle 10 wherein the control devices can be used to operate machine control component MCC. For example, and as illustrated in FIG. 2A, control devices 20A and 20B can be mounted on or in central portion 14 of handle 10 so that they are easily accessible to the operator. Control devices 20A and 20B can be attached to central portion 14 in a spaced apart manner on central portion 14. Also, control devices 20A and 20B can be disposed on opposing sides of a twist control apparatus such as disclosed in U.S. patent application Ser. No. 10/751,801 (filed Jan. 5, 2004), U.S. patent application Ser. No. 11/125,843 (filed May 10, 2005, and issued as U.S. Pat. No. 7,318,309), U.S. patent application Ser. No. 11/925,536 (filed Oct. 26, 2007), and U.S. patent application Ser. No. 11/848,294 (filed Aug. 31, 2007), the disclosures of which are incorporated by reference herein in their entireties. Control devices 20A and 20B do not have to be used in association with such a twist control device however.

Referring to FIGS. 3A through 4B, control devices 20A and 20B can each include an actuator, such as actuators 22A and 22B, respectively, attached in a pivotably movable fashion to handle 10. Actuators 22A and 22B can have a shape of an elongated wedge that is attached to handle 10 at a pivot point. In this way, actuators 22A and 22B can essentially function as a trigger-style push button on handle 10. In particular, when actuators 22A and 22B are in an extended position, shown in FIGS. 3A and 3B, machine control component MCC can be in a disengaged state; whereas when actuators 22A and 22B are in a depressed position, shown in FIGS. 4A and 4B, machine control component MCC can be in an engaged state. As a result, an operator of power machine PM can easily squeeze and release actuator 22 to operate machine control component MCC without letting go of handle 10. This ease of use is notably different from the operation of a typical pivoting bail, in which most users often must let go of the machine handle with at least one hand to reach for the bail and pull it towards himself.

To further improve the usability of control device 20, actuators 22A and 22B can be provided in any of a variety of forms. For instance, actuators 22A and 22B can each be a single push-button mounted on central portion 14. Actuators 22A and 22B can each comprise an elongated bar portion that extends substantially along the length of central portion 14. Actuators 22A and 22B can be positioned so that actuator 22A serves as a left actuator and actuator 22B serves as a right actuator on left and right side portions, respectively, central portion 14 of handle 10. In this two-button configuration, the operator can choose to move left actuator 22A alone, right actuator 22B alone, or both actuators together to operate machine control component MCC. As a result, this configuration can provide greater flexibility to accommodate the preferences of different operators.

To connect the movement of actuators 22A and 22B to the operation of machine control component MCC, control devices 20A and 20B can further include a sliding cam 24A and 24B, respectively, movable within handle 10. With continuing reference to FIGS. 3A through 4B, sliding cams 24A and 24B can be mounted within central portion 14 of handle 10 and can be slidably movable therein. Specifically, sliding cams 24A and 24B can be mounted on a track or slot, generally designated 18A and 18B, respectively, as shown in FIGS. 3A through 4B to control the direction of movement of sliding cams 24A and 24B within handle 10.

Sliding cams 24A and 24B can have cam surfaces 26A and 26B, respectively, positioned facing respective actuators 22A and 22B. When either or both of the actuators is in a disengaged state (See, e.g., FIGS. 3A and 3B), actuators 22A and 22B can be positioned apart from respective cam surfaces 26A and 26B, or they can be in contact with the cam surfaces. In either arrangement, movement of actuators 22A and 22B toward respective cam surfaces 26A and 26B can cause actuators 22A and 22B to engage at least a portion of sliding cams 24A and 24B, respectively, for instance by applying a force to corresponding cam surfaces 26A and 26B. In particular, actuators 22A and 22B can include engagement tabs 28A and 28B, respectively, for movement against respective cam surfaces 26A and 26B. Cam surfaces 26A and 26B can be shaped such that this interaction causes sliding cams 24A and 24B, respectively, to move within handle 10.

For instance, sliding cams 24A and 24B can be substantially wedge-shaped such that a force applied by actuators 22A and 22B against cam surfaces 26A and 26B, respectively, (e.g., via engagement tabs 28A and 28B, respectively) in one direction can cause sliding cams 24A and 24B, respectively, to move in a second direction. In one particular example, if actuators 22A and 22B are adapted to move against sliding cams 24A and 24B, respectively, in a direction perpendicular to handle 10, the shape of cam surfaces 26A and 26B can be designed such that the applied force is translated to a movement of sliding cams 24A and 24B in a direction coaxial with handle 10. As noted above, sliding cams 24A and 24B can be movable in slots 18A and 18B, respectively, formed within handle 10 to further control the movement of sliding cams 24A and 24B in such a direction.

Left and right sliding cams 24A and 24B can be separate components that can be movable independently, or they can be linked such that movement of one cam causes both cams to move together. For instance, a link 32 can be provided to connect left sliding cam 24A to right sliding cam 24B. In particular, link 32 can be a cable extending through central portion 14 of handle 10 between left and right sliding cams 24A and 24B. With the sliding cams linked in this manner, the movement of left and right sliding cams 24A and 24B with respect to left and right actuators 22A and 22B, respectively, can be designed such that both left and right sliding cams 24A and 24B move in the same direction within central portion 14. As a result, movement of one cam can cause a corresponding movement of the other.

The interconnection of sliding cams 24A and 24B to machine control component MCC can be accomplished using a cable 30 connected thereto. Therefore, where movement of either of actuators 22A and 22B causes sliding cams 24A or 24B, respectively, to move within handle 10, the movement of sliding cams 24A or 24B can in turn move cable 30 to engage machine control component MCC. In some embodiments, cable 30 can be a Bowden wire, at least a portion of which can be encased and extend through a coaxial sheath. Cable 30 can be positioned along one of spaced-apart legs 12A or 12B. Alternatively, cable 30 can be positioned within handle 10 (i.e., within one of spaced-apart legs 12A or 12B) to both improve the aesthetics by hiding cable 30 from view and prevent inadvertent actuation of machine control component MCC.

In some configurations, cable 30 can be attached to both sliding cams 24A and 24B separately such that movement of either cam independent of the other moves cable 30 to actuate machine control component MCC. Alternatively, sliding cams 24A and 24B can be linked together as noted above (e.g., using link 32), and cable 30 can be connected to one of the cams. In this arrangement, cable 30 can be moved regardless of which actuator portion (i.e., left actuator 22A or right actuator 22B) is depressed. For example, as is shown in FIGS. 3A through 4B, cable 30 can be connected to left sliding cam 24A, and right sliding cam 24B can be connected to left sliding cam 24A via link 32. In this configuration, movement of left actuator 22A can cause the movement of left sliding cam 24A to pull cable 30 and thereby operate machine control component MCC. In contrast, movement of right actuator 22B can cause the movement of right sliding cam 24B, but Instead of directly pulling cable 30, this movement can pull link 32, which in turn causes movement of left sliding cam 24A to pull cable 30. As a result, movement of either actuator 22A or 22B can be used to control machine control component MCC, but only one cable 30 need be provided.

Such an arrangement in which the movement of both sliding cams 24A and 24B is connected may be advantageous, for example, in situations where the operator decides to switch which of actuators 22A or 22B is depressed (i.e., chooses to grip with the other hand). In such a situation, there would be no change in the state of machine control component MCC because it would not matter which of the sliding cams is moved to an engaged position, only that at least one of sliding cams 24A or 24B is moved.

Regardless of the specific configuration, sliding cams 24A and 24B and cam surfaces 26A and 26B can be designed such that a relatively small movement of actuators 22A and 22B can produce a relatively larger movement of sliding cams 24A and 24B, respectively. In this way, a relatively small input from the operator of power machine PM can cause a movement of sliding cams 24A and 24B sufficient to move cable 30 and actuate machine control component MCC. For instance, sliding cams 24A and/or 24B and cam surfaces 26A and/or 26B, respectively, can be designed so that moving actuators 22A and/or 22B between disengaged and engaged positions by pivoting actuators 22A and/or 22B between about 5 to 15 degrees (e.g., about 8 degrees) relative to handle 10 can be enough to engage or disengage machine control component MCC.

A biasing mechanism, such as a spring element S, can be connected to machine control component MCC or to control devices 20A and 20B. For instance, as is illustrated in FIG. 2B, the biasing mechanism can be the spring element S on the engine brake as can be used to return a typical bail system. Alternatively, the biasing mechanism can be incorporated into handle 10, for instance as a compression spring (not shown) associated with one of control devices 20A or 20B. In this alternative configuration, the biasing mechanism can return the respective sliding cam 24A or 24B to a disengaged position, thereby releasing the engine brake and pushing respective actuator 22A or 22B back up. In either configuration, the biasing mechanism can bias machine control component MCC toward a disengaged state to help fulfill the safety purpose of the dead man control. In this way, if the operator does not apply a sufficient force to depress actuators 22A and/or 22B against cam surfaces 26A and 26, respectively, of sliding cam 24, the biasing mechanism can operate to move machine control component MCC to a disengaged state. The design of actuators 22A and 22B, sliding cams 24A and 24B (including cam surfaces 26A and 26B), and/or the biasing mechanism can be selected, however, such that only a low holding force (e.g., less than about 1.5 kg) is required to maintain the activation of machine control component MCC.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A control device for controlling a machine-control component of a walk-behind machine, the control device comprising:
    a handle for a walk-behind machine;
    at least one slot within the handle;
    a sliding cam movable in the at least one slot within the handle, the sliding cam configured for operable connection with a machine-control component of the walk-behind machine; and
    an actuator movably attached to the handle, the actuator engaging at least a portion of the sliding cam such that movement of the actuator causes movement of the sliding cam relative to the actuator in the at least one slot;
    whereby the actuator is movable in a first direction to cause the sliding cam to move in a second direction different from the first direction for controlling the machine-control component of the walk-behind machine.

2. The device of claim 1, wherein the sliding cam has a cam surface, wherein movement of the actuator against the cam surface causes the sliding cam to move relative to the actuator in the at least one slot within the handle.

3. The device of claim 2, wherein the actuator comprises an engagement tab for movement against the cam surface of the sliding cam.

4. The device of claim 1, wherein the sliding cam is wedge-shaped.

5. The device of claim 1, wherein the actuator comprises a left actuator and a right actuator on respective ends of the handle.

6. The device of claim 5, wherein the sliding cam comprises a left sliding cam and a right sliding cam, the left sliding cam corresponding to the left actuator such that movement of the left actuator moves the left sliding cam within the handle, and the right sliding cam corresponding to the right actuator such that movement of the right actuator moves the right sliding cam within the handle; and wherein the machine-control component is controlled when either of the left sliding cam or the right sliding cam is moved.

7. The device of claim 1, wherein the actuator is pivotably attached to the handle.

8. The device of claim 1, wherein the actuator comprises at least one push button connected on the handle.

9. The device of claim 1, further comprising a cable connected to the sliding cam and to the machine control component of the walk-behind machine, wherein movement of the sliding cam within the handle moves the cable to control the machine control component.

10. The device of claim 9, wherein the cable is positioned within the handle.

11. The device of claim 1, wherein the at least one slot is substantially linear.

12. A control device for controlling a machine-control component of a walk-behind machine, the control device comprising:

a handle for a walk-behind machine;

at least one slot within the handle;

a sliding cam movable in the at least one slot within the handle, the sliding cam having a left sliding cam and a right sliding cam, each of the left sliding cam and the right sliding cam configured for operable connection with a machine-control component of the walk-behind machine;

a left actuator movably connected to the handle, the left actuator engaging at least a portion of the left sliding cam such that movement of the left actuator causes movement of the left sliding cam relative to the left actuator in the at least one slot; and a right actuator movably connected to the handle, the right actuator engaging at least a portion of the right sliding cam such that movement of the right actuator causes movement of the right sliding cam relative to the right actuator in the at least one slot;

whereby the left actuator is movable in a first direction to cause the left sliding cam to move in a second direction different from the first direction for controlling the machine-control component of the walk-behind machine; and whereby the right actuator is movable in a first direction to cause the right sliding cam to move in a second direction different from the first direction for controlling the machine-control component of the walk-behind machine.

13. The device of claim 12, wherein each of the left sliding cam and the right sliding cam has a cam surface;

wherein movement of the left actuator against the cam surface of the left sliding cam causes the left sliding cam to move relative to the left actuator in the at least one slot within the handle; and wherein movement of the right actuator against the cam surface of the right sliding cam causes the right sliding cam to move relative to the right actuator in the at least one slot within the handle.

14. The device of claim 12, further comprising a cable connected to at least one of the left sliding cam or the right sliding cam, the cable being connected to the machine control component of the walk-behind machine;

wherein movement of the at least one of the left sliding cam or the right sliding cam moves the cable to control the machine control component.

15. The device of claim 12, wherein the at least one slot is substantially linear.

16. A method for controlling a machine-control component of a walk-behind machine, the method comprising:

moving an actuator attached to a handle of a walk-behind machine in a first direction towards a sliding cam contained within the handle, the sliding cam being configured for operable connection with a machine-control component of the walk-behind machine;

wherein moving the actuator in the first direction causes the actuator to engage at least a portion of the sliding cam to move the sliding cam in a second direction different from the first direction in at least one slot within the handle such that the machine-control component of the walk-behind machine is controlled.

17. The method of claim 16, wherein moving the actuator in the first direction comprises pivoting the actuator, and moving the sliding cam in the second direction comprises moving the sliding cam in a substantially linear path.

* * * * *